United States Patent
Raghavan et al.

(10) Patent No.: US 12,273,176 B2
(45) Date of Patent: Apr. 8, 2025

(54) ENHANCEMENTS TO SUPPORT TRP SPECIFIC BEAM FAILURE RECOVERY

(71) Applicant: Apple Inc., Cupertino, CA (US)

(72) Inventors: Manasa Raghavan, Sunnyvale, CA (US); Jie Cui, San Jose, CA (US); Qiming Li, Beijing (CN); Yushu Zhang, Beijing (CN); Yang Tang, San Jose, CA (US); Haitong Sun, Cupertino, CA (US); Huaning Niu, San Jose, CA (US); Xiang Chen, Campbell, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/906,225

(22) PCT Filed: Sep. 24, 2021

(86) PCT No.: PCT/CN2021/120392
§ 371 (c)(1),
(2) Date: Sep. 13, 2022

(87) PCT Pub. No.: WO2023/044776
PCT Pub. Date: Mar. 30, 2023

(65) Prior Publication Data
US 2024/0204854 A1    Jun. 20, 2024

(51) Int. Cl.
*H04B 7/06* (2006.01)
(52) U.S. Cl.
CPC .................. *H04B 7/06964* (2023.05)

(58) Field of Classification Search
CPC .. H04B 7/06964; H04B 7/0695; H04B 7/088; H04W 76/28
See application file for complete search history.

(56) References Cited

U.S. PATENT DOCUMENTS

2021/0127391 A1* 4/2021 Zhang ............... H04W 24/10
2021/0144049 A1* 5/2021 Lin .................... H04L 5/001
(Continued)

FOREIGN PATENT DOCUMENTS

WO   2020/143049   7/2020
WO   2021/027185   2/2021

OTHER PUBLICATIONS

R4-2113511, "Discussion on TRP specific link recovery procedures in FeMIMO", Ericsson, 3GPP TSG RAN WG4 Meeting #100-e, Electronic Meeting, Aug. 16, 2021-Aug. 27, 2021 (Year: 2021).*
(Continued)

*Primary Examiner* — Aristocratis Fotakis
(74) *Attorney, Agent, or Firm* — Fay Kaplun & Marcin, LLP (57) ABSTRACT

A user equipment (UE) is configured to establish a connection to a base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2, detect a beam failure during a beam failure detection (BFD) evaluation period, identify one or more candidate beams during a candidate beam detection (CBD) evaluation period and transmit a beam failure recovery (BFR) request to the base station.

18 Claims, 6 Drawing Sheets

(56) References Cited

U.S. PATENT DOCUMENTS

| | | | |
|---|---|---|---|
| 2021/0282168 A1 | 9/2021 | Matsumura et al. | |
| 2022/0045806 A1* | 2/2022 | Cirik | H04L 1/1887 |
| 2022/0046740 A1* | 2/2022 | Lo | H04B 7/088 |
| 2022/0103233 A1* | 3/2022 | Zhou | H04B 7/088 |
| 2022/0303807 A1* | 9/2022 | Cui | H04B 7/0695 |
| 2022/0330039 A1* | 10/2022 | Wang | H04W 24/10 |
| 2022/0369121 A1* | 11/2022 | Islam | H04W 56/001 |
| 2023/0090317 A1* | 3/2023 | Kyung | H04B 7/06964 |
| | | | 370/329 |

OTHER PUBLICATIONS

Huawei et al., "Discussion on link recovery requirements for R17 NR FeMIMO", 3GPP TSG RAN WG4, Meeting #100-e, R4-2113824, Aug. 6, 2021, 4 sheets.

Huawei et al., "Feature Summary of Enhancements on Multi-TRP/Panel Transmission", 3GPP TSG RAN WG1 Meeting #99, R1-1913299, Nov. 25, 2019, 88 sheets.

\* cited by examiner

Table 500

| Configuration | TEvaluate_BFD_CSI-RS (ms) |
|---|---|
| no DRX | $\text{Max}(50, [M_{BFD} \times P \times N \times P_{BFD} \times P_{TRP}] \times T_{CSI-RS})$ |
| DRX cycle ≤ 320ms | $\text{Max}(50, [1.5 \times M_{BFD} \times P \times N \times P_{BFD} \times P_{TRP}] \times \text{Max}(T_{DRX}, T_{CSI-RS}))$ |
| DRX cycle > 320ms | $[M_{BFD} \times P \times N \times P_{BFD} \times P_{TRP}] \times T_{DRX}$ |

Fig. 5

| Configuration | TEvaluate_CBD_CSI-RS (ms) |
|---|---|
| No DRX or DRX cycle ≤ 320ms | $Max(25, Ceil(M_{CBD} \times P \times N \times P_{CBD} \times P_{TRP}) \times T_{CSI-RS})$ |
| DRX cycle > 320ms | $Ceil(M_{CBD} \times P \times N \times P_{CBD} \times P_{TRP}) \times T_{DRX}$ |

Method 600

Fig. 6

ENHANCEMENTS TO SUPPORT TRP SPECIFIC BEAM FAILURE RECOVERY

BACKGROUND

A base station of a network may be configured with multiple transmission and reception points (TRPs) each configured to perform beamforming. For example, the base station may transmit a first beam from a first TRP to a user equipment (UE) and a second beam from a second TRP to the UE. To acquire and maintain a beam between the UE and each of the TRPs, beam management techniques may be implemented on both the UE side and the network side.

SUMMARY

Some exemplary embodiments are related to a user equipment (UE) configured to perform operations. The operations include establishing a connection to a base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2, detecting a beam failure during a beam failure detection (BFD) evaluation period, identifying one or more candidate beams during a candidate beam detection (CBD) evaluation period and transmitting a beam failure recovery (BFR) request to the base station.

Other exemplary embodiments are related to a processor of a base station configured to perform operations. The operations include establishing a connection to a user equipment (UE), wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2, receiving a beam failure recovery (BFR) request from the UE and transmitting a response to the BFR request to the UE.

Still further exemplary embodiments are related to a user equipment (UE) having a transceiver configured to communicate with a network and a processor communicatively coupled to the transceiver and configured to perform operations. The operations include establishing a connection to a base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2, detecting a beam failure during a beam failure detection (BFD) evaluation period, identifying one or more candidate beams during a candidate beam detection (CBD) evaluation period and transmitting a beam failure recovery (BFR) request to the base station.

Additional exemplary embodiments are related to a base station having a transceiver configured to communicate with a user equipment (UE) and a processor communicatively coupled to the transceiver and configured to perform operations. The operations include establishing a connection to the UE, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2, receiving a beam failure recovery (BFR) request from the UE and transmitting a response to the BFR request to the UE.

DETAILED DESCRIPTION

The exemplary embodiments may be further understood with reference to the following description and the related appended drawings, wherein like elements are provided with the same reference numerals. The exemplary embodiments relate to beam management and multi-transmission reception point (TRP) deployment. As will be described in more detail below, the exemplary embodiments introduce enhancements to beam failure detection (BFD), candidate beam detection (CBD) and a beam failure recovery (BFR) request. These exemplary enhancements are configured to support TRP specific beam failure recovery.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a 5G new radio (NR) network. However, reference to a 5G NR network is provided for illustrative purposes. The exemplary embodiments may be utilized with any network that is configured with multi-TRP capability. Therefore, the 5G NR network as described herein may represent any type of network that utilizes beamforming and is configured with multi-TRP capability.

The 5G NR network may deploy a next generation node B (gNB) that is configured with multiple TRPs. Throughout this description, a TRP generally refers to a set of components configured to transmit and/or receive a beam. In some embodiments, multiple TRPs may be deployed locally at the gNB. For example, the gNB may include multiple antenna arrays/panels that are configured to generate different beams. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

The exemplary embodiments relate to beam management. The term beam management encompasses a variety of different procedures including, but not limited to, BFD, CBD and BFR. As indicated above, the exemplary embodiments introduce enhancements to BFD, CBD and BFR. Prior to discussing the exemplary enhancements, the following examples provide a general overview of BFD, CBD and BFR.

For BFD, a base station may configure BFD reference signals and the UE may collect measurement data based on the BFD reference signals. The UE may declare a beam failure when a beam failure triggering condition has been met. For instance, a beam failure condition may comprise identifying that a number of beam failure instance indications from the physical layer reaches a configured threshold before a configured timer expires. The beam failure instance indications may be based, at least in part, on the measurement data collected from the BFD reference signals.

To differentiate between different beam management procedures, reference signals for BFD may be referred to as BFD-RS. However, the use of the term "BFD-RS" is merely provided for illustrative purposes and may encompass channel state information-reference signals (CSI-RS), synchronization signal blocks (SSBs), or any other appropriate type of signal configured for BFD. Therefore, the BFD-RS as described herein is used to represent any appropriate type of signal.

After a beam failure event is declared, the UE may identify candidate beams and trigger a BFR procedure. For CBD, a beam may be configured with CBD reference signals and the UE may collect measurement data based on the CBD reference signals. The UE may then identify one or more beams and report the candidate beam information to the network by transmitting a BFR request to the network. The UE may then monitor for a response to the BFR request transmitted on one of the candidate beams identified by the UE. The BFR request and the response to the BFR request may be part of a random access channel (RACH) procedure. When the RACH procedure is complete, BFR may be considered complete.

To differentiate between different beam management procedures, reference signals for CBD may be referred to as CBD-RS. However, the use of the term "CBD-RS" is merely provided for illustrative purposes and may encompass channel state information-reference signals (CSI-RS), synchronization signal blocks (SSBs), or any other appropriate type of signal configured for CBD. Therefore, the CBD-RS as described herein is used to represent any appropriate type of signal.

The examples provided above regarding BFD, CBD and BFR are not intended to limit the exemplary embodiments in any way. Instead, the examples are provided as a general overview of how these types of procedures may relate to one another.

As will be described in more detail below, in one aspect, the exemplary embodiments introduce enhancements to a BFD evaluation period that are configured to support TRP specific BFD in a multi-TRP deployment scenario. Throughout this description, the term "BFD evaluation period" refers to a duration of time during which signals are received, measurement data is collected and conditions related to BFD are evaluated by the UE.

In a second aspect, the exemplary embodiments introduce enhancements to a CBD evaluation period that are configured to support TRP specific CBD in a multi-TRP deployment scenario. Throughout this description, the term "CBD evaluation period" refers to a duration of time during which signals are received, measurement data is collected and conditions related to CBD are evaluated by the UE.

In a further aspect, the exemplary embodiments introduce enhancements to a BFR request for a multi-TRP deployment scenario. Each of these exemplary enhancements may be used independently from one another, in conjunction with currently implemented beam management mechanisms, future implementations of beam management mechanisms or independently from other beam management mechanisms.

Figure 1:
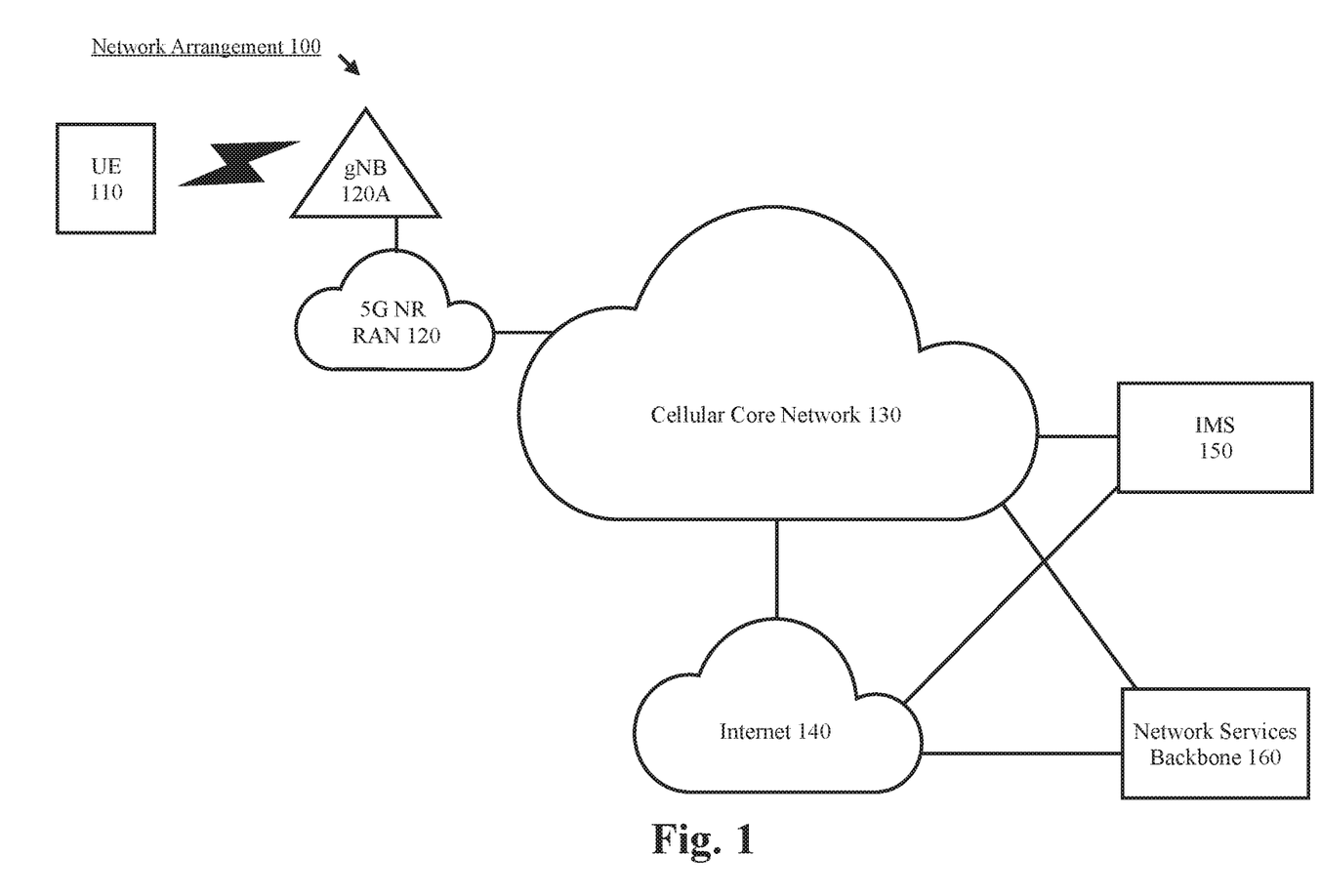
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The 5G NR RAN 120 includes a next generation node B (gNB) 120A that is configured with multiple TRPs. Each TRP may represent one or more components configured to transmit and/or receive a signal. In some embodiments, multiple TRPs may be deployed locally at the gNB 120A. In other embodiments, multiple TRPs may be distributed at different locations and connected to the gNB.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
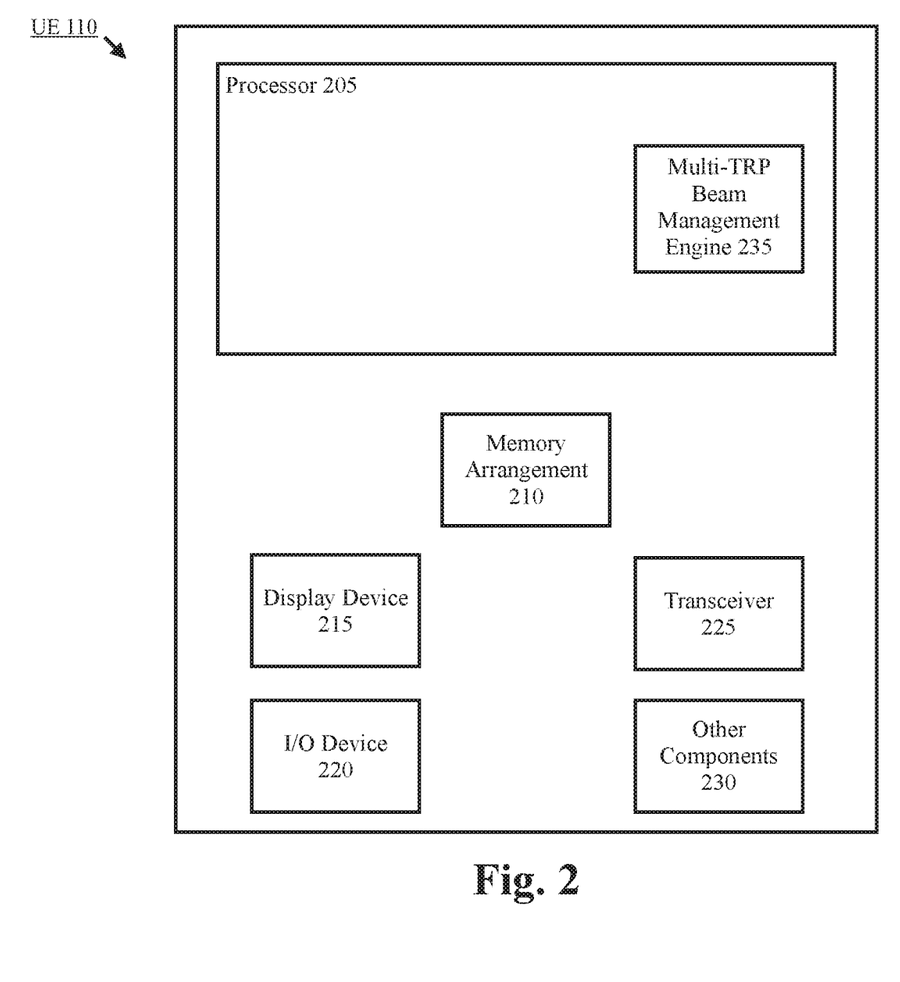
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a multi-TRP beam management engine 235. The multi-TRP beam management engine 235 may be configured to perform operations related to beam management such as, collecting measurement data, identifying a beam failure, identifying a candidate beam, transmitting a BFR request, etc.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
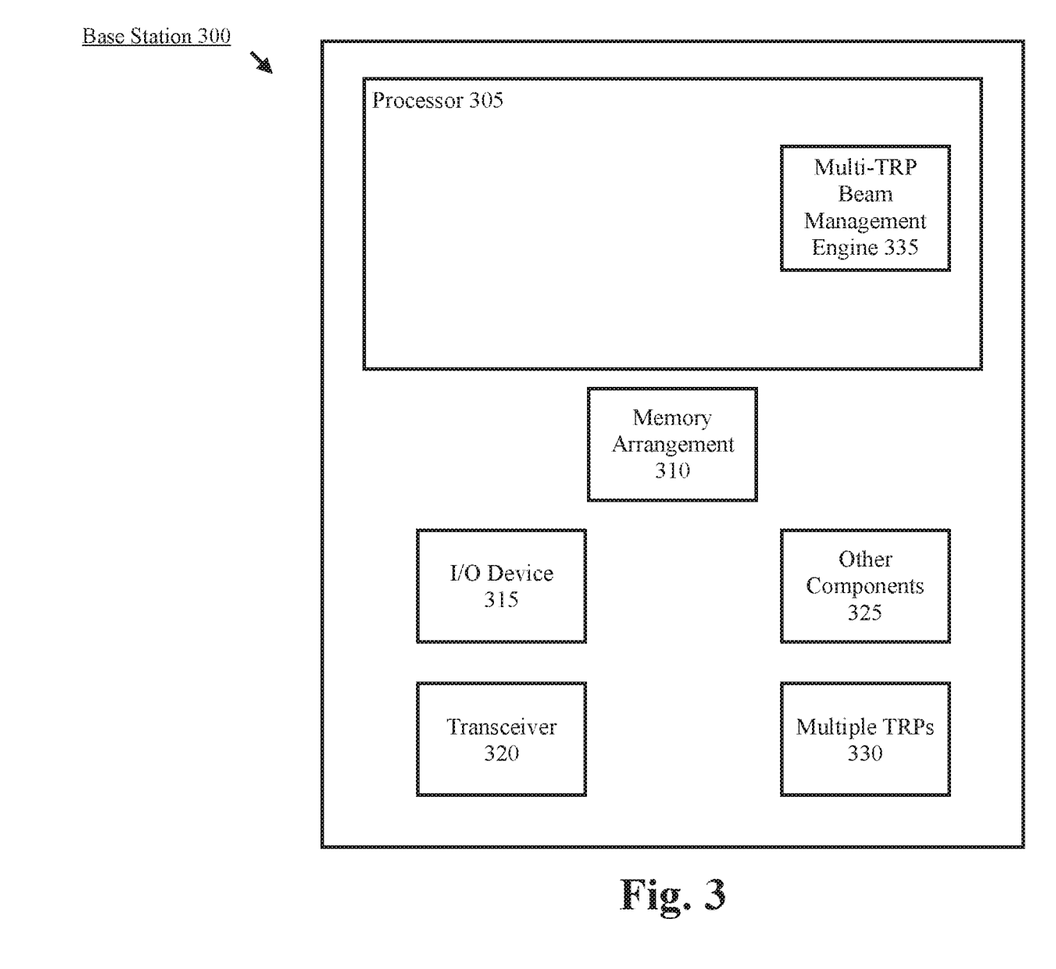
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320, other components 325 and multiple TRPs 330. As indicated above, in some scenarios, the multiple TRPs 330 may be deployed locally at the base station 300. In other scenarios, one or more of the multiple TRPs may be deployed at physical locations remote from the base station 300 and connected to the base statin via a backhaul connection. The base station 300 may be configured to control the multiple TRPs 330 and perform operations such as, but not limited to, assigning resources, configuring reference signals (or SSBs), implementing beam management techniques, etc.

The processor 305 may be configured to execute a plurality of engines for the base station 300. For example, the engines may include a multi-TRP beam management engine 335. The multi-TRP beam management engine 335 may be configured to perform operations related to beam management such as, assigning resources, transmitting TRP specific reference signals, receiving a BFR request, etc.

The above noted engine 335 being an application (e.g., a program) executed by the processor 305 is only exemplary. The functionality associated with the engine 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs. The other components 325 may include, for example, an audio input device, an audio output device, a battery, a data acquisition device, ports to electrically connect the base station 300 to other electronic devices, etc.

Figure 4:
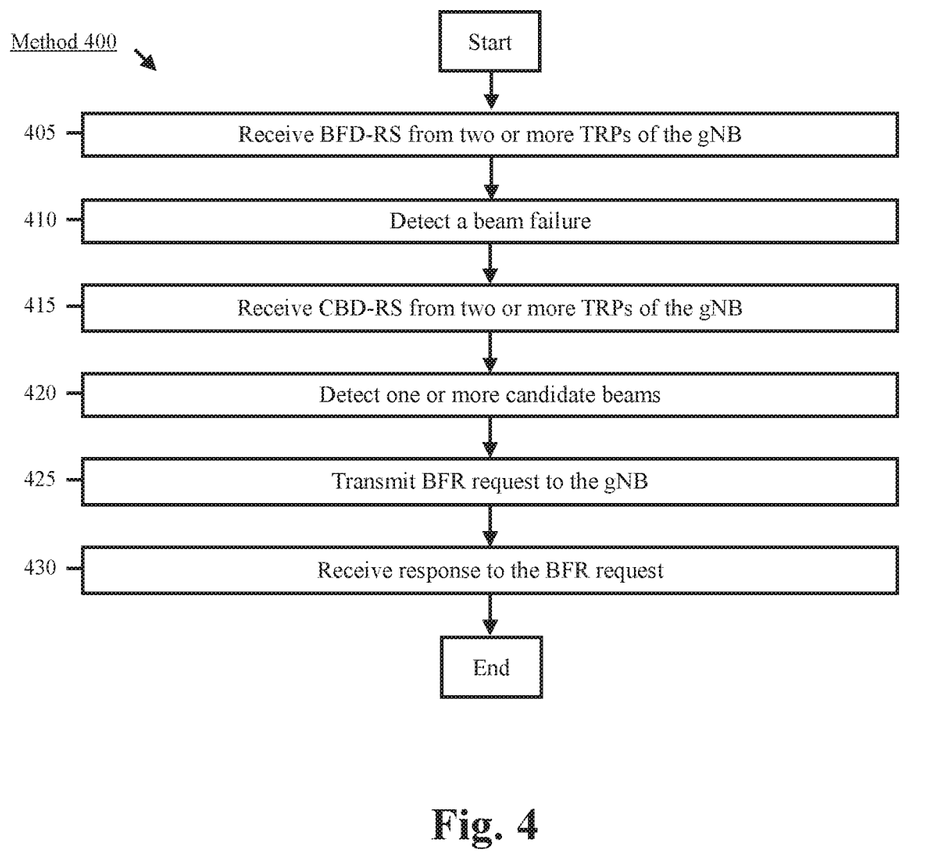
FIG. 4 shows a method for implementing exemplary enhancements that are configured to support beam management in a multi-transmission reception point (TRP) deployment scenario according to various exemplary embodiments.

FIG. 4 shows a method 400 for implementing exemplary enhancements that are configured to support beam management in a multi-TRP deployment scenario. The method 400 is described from the perspective of the UE 110 deployed within a multi-TRP environment and provides a general overview of a scenario in which these exemplary enhancements may be utilized. However, the exemplary enhancements are not limited to the scenario described with regard to the method 400 and may be used independently from one another, in conjunction with other currently implemented beam management mechanisms, in conjunction with future implementations of beam management mechanisms or independently from other beam management mechanisms.

Initially, consider a scenario in which the UE 110 is connected to the gNB 120A and configured with two or more downlink beams each corresponding to a different TRP. In addition, the UE 110 has already received beam management configuration information from the gNB 120A. For example, the UE 110 may receive one or more radio resource control (RRC) messages comprising configuration information for BFR including but not limited to, threshold values for BFD, timer configurations for BFD, threshold values for CBD, timer configurations for CBD, trigger conditions for BFR, RACH configurations for BFR and PRACH resource configuration information for CSI-RS and/or SSB (e.g., BFD-RS, CBD-RS).

In 405, the UE 110 receives BFD-RS from two or more TRPs of the gNB 120A. As mentioned above, the term "BFD-RS" may encompass CSI-RS, SSB or any other appropriate signal configured for BFD.

In 410, the UE 110 detects a beam failure. For example, the UE 110 may identify a TRP specific beam failure condition corresponding to a particular TRP based on a number of beam failure instance indications exceeding a threshold value before a configured timer expires. However, the exemplary embodiments are not limited to any particular type of beam failure event. Instead, the exemplary embodiments introduce enhancements to a BFD evaluation period. The term BFD evaluation period refers to a duration of time during which signals are received, measurement data is collected and conditions related to BFD are to be evaluated by the UE 110.

For TRP specific BFR in a multi-TRP configuration, the UE 110 may need to receive and evaluate each TRP separately. For instance, in this example it is assumed that the UE 110 does not support simultaneous reception of multiple beams in frequency range 2 (FR2). Those skilled in the art will understand that FR2 refers to frequencies that are allocated to 5G in the millimeter wave (mmWave) region above 24 giga hertz (GHz) and may support beamformed communication. Since the UE 110 cannot receive two beams simultaneously, the BFD evaluation period needs to be configured to evaluate BFD for each TRP separately. Throughout this description, the BFD evaluation period may be referred to as $T_{Evaluate\_BFD\_BFD-RS}$ and may be applicable to FR2 based communication. However, reference to $T_{Evaluate\_BFD\_BFD-RS}$ is an example, different entities may refer to a similar concept by a different name. For example, the BFD evaluation period may be referred to as $T_{Evaluate\_BFD\_CSI-RS}$ or $T_{Evaluate\_BFD\_SSB}$.

The exemplary embodiments introduce a sharing factor for TRP specific BFD that may be used to derive a BFD evaluation period. Throughout this description, this sharing factor may be referred to as a "BFD TRP sharing factor" or $P_{TRP}$. However, reference to a BFD TRP sharing factor and $P_{TRP}$ is merely provided for illustrative purposes. Different entities may refer to a similar concept by a different name.

In some embodiments, the BFD TRP sharing factor may be configured to ensure equal sharing between each TRP. In other embodiments, the BFD sharing factor may be configured to ensure that a first portion of the BFD evaluation period is to be used for a first TRP and a second portion of the evaluation period is to be used for a second TRP. For example, a first TRP may use X % (e.g., 100/X) of the BFD evaluation period and a second TRP may use 100/(100−X) of the BFD evaluation period. The BED TRP sharing factor may be hard encoded in third generation partnership (3GPP) Specifications, preconfigured at the UE 110 or indicated by the network (e.g., RRC message, etc.).

In addition to the BFD sharing factor, the BED evaluation period may be based on factors such as, but not limited to, a number of samples, a sharing factor related to other types of configured measurements, a sharing factor related to secondary cell (SCell) BFD, a scaling factor for receive (RX) beam refinement, measurement resource periodicity, a discontinuous reception (DRX) cycle configuration and/or any other appropriate factor related to BFD. Examples for deriving a BFD evaluation period based on, at least in part, the BFD TRP sharing factor are provided below with regard to table 500 of FIG. 5.

Figure 5:
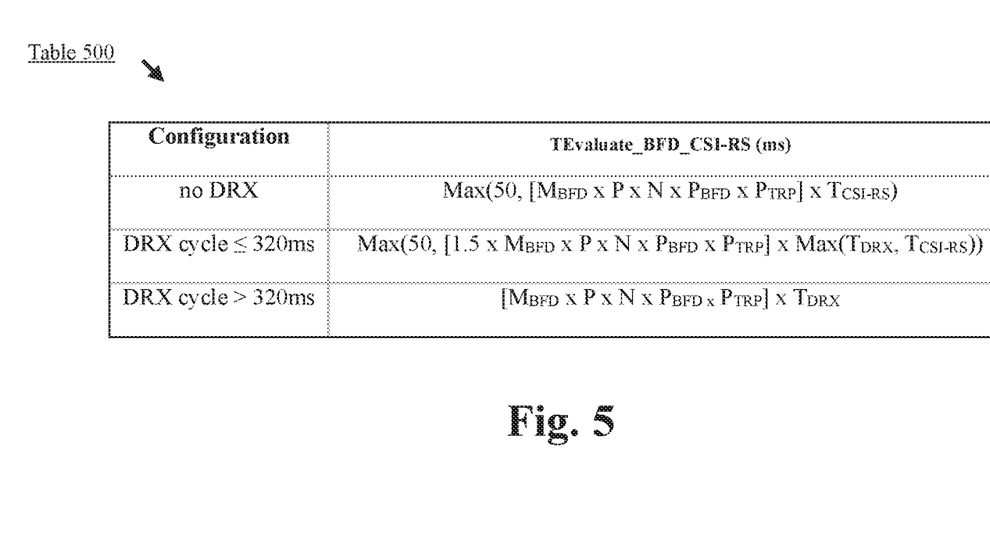
FIG. 5 shows a table for deriving a beam failure detection (BFD) evaluation period for different types of UE configurations according to various exemplary embodiments.

FIG. 5 shows a table 500 for deriving a BFD evaluation period for different types of UE configurations. When the UE 110 is not configured with a DRX cycle, $T_{Evaluate\_BFD\_BFD-RS}$ may be derived based on the following equation:

$$\mathrm{Max}(50, [M_{BFD} \times P \times N \times P_{BFD} \times P_{TRP}] \times T_{BFD-RS})$$

Here, $M_{BFD}$ represents a number of samples, P represents a sharing factor related to other types of configured measurements, N represents a scaling factor for RX beam refinement, $P_{BFD}$ represents a sharing factor for related to SCell BFD, $P_{TRP}$ represents the exemplary BFD TRP sharing factor described above and $T_{BFD-RS}$ represents the periodicity of the measurement resource (e.g., CSI-RS, SSB, etc.).

When the UE 110 is configured with a DRX cycle duration that is less than 320 milliseconds (ms), $T_{Evaluate\_BFD\_BFD-RS}$ may be derived based on the following equation:

$$\mathrm{Max}(50, [1.5 \times M_{BFD} \times P \times N \times P_{BFD} \times P_{TRP}] \times \mathrm{Max}(T_{DRX}, T_{BFD-RS}))$$

Here, $M_{BFD}$ represents a number of samples, P represents a sharing factor related to other types of configured measurements, N represents a scaling factor for RX beam refinement, $P_{BFD}$ represents a sharing factor related to SCell BFD, $P_{TRP}$ represents the exemplary BFD TRP sharing factor described above, $T_{DRX}$ represents the DRX cycle length and $T_{BFD-RS}$ represents the periodicity of the measurement resource (e.g., CSI-RS, SSB, etc.).

When the UE 110 is configured with a DRX cycle duration that is greater than 320 ms, $T_{Evaluate\_BFD\_BFD-RS}$ may be derived based on the following equation:

$$[M_{BFD} \times P \times N \times P_{BFD} \times P_{TRP}] \times T_{DRX}$$

Here, $M_{BFD}$ represents a number of samples, P represents a sharing factor related to other types of configured measurements, N represents a scaling factor for RX beam refinement, $P_{BFD}$ represents a sharing factor related to SCell BFD, $P_{TRP}$ represents the exemplary BFD TRP sharing factor described above and $T_{DRX}$ represents the DRX cycle length.

Returning to the method 400, in 415, the UE 110 receives CBD-RS from two or more TRPs of the gNB 120A. As mentioned above, the term "CBD-RS" may encompass CSI-RS, SSB or any other appropriate signal configured for CBD.

In 420, the UE 110 detects one or mode candidate beams. For example, the UE 110 may a identify candidate beam for TRP specific BFR based on comparing measurement data to a threshold value. The UE 110 may then report the candidate beam information to the network by transmitting a BFR request to the network as mentioned below in 425. The exemplary embodiments are not limited to identifying a candidate beam based on any particular condition. Instead, the exemplary embodiments introduce enhancements to a CBD evaluation period. The term CBD evaluation period refers to a duration of time during which signals are received, measurement data is collected and conditions related to CBD are to be evaluated by the UE 110.

CBD in a multi-TRP configuration, the UE 110 may need to evaluate each TRP separately. For instance, in this example it is assumed that the UE 110 does not support simultaneous reception of multiple beams in FR2. Since the UE 110 cannot receive two beams simultaneously, the CBD evaluation period needs to be configured to evaluate CBD for each TRP separately. Throughout this description, the CBD evaluation period may be referred to as $T_{Evaluate\_CBD\_CBD-RS}$ and may be applicable to FR2 based communication. However, reference to $T_{Evaluate\_CBD\_CBD-RS}$ is an example, different entities may refer to a similar concept by a different name. For example, the CBD evaluation period may be referred to as $T_{Evaluate\_CBD\_CSI-RS}$ or $T_{Evaluate\_CBD\_SSB}$.

The exemplary embodiments introduce a sharing factor for TRP specific CBD that may be used to derive a CBD evaluation period. Throughout this description, this sharing factor may be referred to as a "CBD TRP sharing factor" or $P_{CBD}$. However, reference to a CBD TRP sharing factor and $P_{CBD}$ is merely provided for illustrative purposes. Different entities may refer to a similar concept by a different name.

In some embodiments, the CBD TRP sharing factor may be configured to ensure equal sharing between each TRP. In other embodiments, the CBD sharing factor may be configured to ensure that a first portion of the CBD evaluation period is to be used for a first TRP and a second portion of the evaluation period is to be used for a second TRP. For example, a first TRP may use X % (e.g., 100/X) of the CBD evaluation period and a second TRP may use 100/(100−X) of the CBD evaluation period. The CBD TRP sharing factor may be hard encoded in 3GPP Specifications, preconfigured at the UE 110 or indicated by the network (e.g., RRC message, etc.).

In addition to the CBD sharing factor, the CBD evaluation period may be based on factors such as, but not limited to, a number of samples, a sharing factor related to other types of configured measurements, a sharing factor related to SCell BFD, a scaling factor for RX beam refinement, measurement resource periodicity, a DRX cycle configuration and/or any other appropriate factor related to CBD. Examples for deriving a CBD evaluation period based on, at least in part, the CBD TRP sharing factor are provided below with regard to table 600 of FIG. 6.

Figure 6:
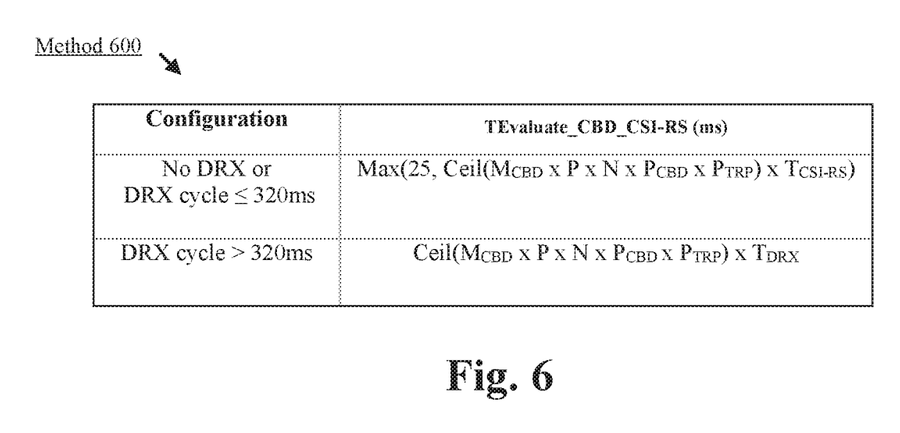
FIG. 6 shows a table for deriving a candidate beam detection (CBD) evaluation period for different types of UE configurations according to various exemplary embodiments.

FIG. 6 shows a table 600 for deriving a CBD evaluation period for different types of UE configurations. When the UE 110 is not configured with a DRX cycle or a DRX cycle that is less than or equal to 320 ms, $T_{Evaluate\_CBD\_CSI-RS}$ may be derived based on the following equation:

$$\mathrm{Max}(25,\mathrm{Ceil}(M_{CBD} \times P \times N \times P_{CBD} \times P_{TRP}) \times T_{CBD-RS})$$

Here, $M_{CBD}$ represents a number of samples, P represents a sharing factor related to other types of configured measurements, N represents a scaling factor for RX beam refinement, $P_{CBD}$ represents a sharing factor for related to SCell CBD, $P_{TRP}$ represents the exemplary CBD TRP sharing factor described above and $T_{CBD-RS}$ represents the periodicity of the measurement resource (e.g., CSI-RS, SSB, etc.).

When the UE 110 is configured with a DRX cycle duration that is greater than 320 ms, $T_{Evaluate\_CBD\_CBD-RS}$ may be derived based on the following equation:

$$\mathrm{Ceil}(M_{CBD} \times P \times N \times P_{CBD} \times P_{TRP}) \times T_{DRX}$$

Here, $M_{CBD}$ represents a number of samples, P represents a sharing factor related to other types of configured measurements, N represents a scaling factor for RX beam refinement, $P_{CBD}$ represents a sharing factor related to SCell CBD, $P_{TRP}$ represents the exemplary CBD TRP sharing factor described above and $T_{DRX}$ represents the DRX cycle length.

Returning to the method 400, in 425, the UE 110 transmits a BFR request to the gNB 120A. The BFR request may be a medium access control (MAC) control element (CE) and convey information such as, but not limited to, failed component carrier (CC) indices and one or more candidate beams for a failed TRP and/or corresponding CC. However, this type of BFR request is an example and the exemplary embodiments may apply to any appropriate type of BFR request.

Under conventional circumstances, the UE 110 typically uses the same beam for uplink and downlink communication. However, if the UE 110 were to attempt to transmit the BFR request using a downlink beam associated with a beam failure, the BFR request would likely not be successfully received by the gNB 120A.

In a multi-TRP configuration, if the UE 110 detects BFD on one of the TRPs, the UE 110 may transmit the BFR on the other TRP. Thus, if the UE 110 declares a BFD on a first TRP while configured with a first and second TRP, the UE 110 transmits the BF request to the second different TRP. This may increase the likelihood that the BFR request is successfully received at the gNB 120A.

One or more CCs may be configured with multi-TRP communication and per TRP BFR. If the UE detects a beam failure on both TRPs associated with a CC, the UE 110 may transmit the BFR request on a different uplink CC. For example, if BFD is detected on a SCell configured with multi-TRP the BFR request may be transmitted on an uplink CC associated with a primary cell (PCell) or vice versa.

In 430, the UE 110 receives a response to the BFR request from the gNB 120A. The response may indicate to the UE 110 that the BFR is a success or a failure. For example, the BFR request may be part of a RACH procedure and the response may be a random access response (RAR), msgB, a RRC complete message or any other message that may be transmitted to the UE 110 during a RACH. However, this example is merely provided for illustrative purposes. The contents of the response to the BFR request is beyond the scope of the exemplary embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
    establishing a connection to a base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2;
    detecting a beam failure during a beam failure detection (BFD) evaluation period;
    identifying one or more candidate beams during a candidate beam detection (CBD) evaluation period, wherein the CBD evaluation period is based on Max(25,Ceil $(M_{CBD} \times P \times N \times P_{CBD} \times P_{TRP}) \times T_{CBD-RS}$),
    wherein $M_{CBD}$ represents a number of samples,
    wherein P represents a sharing factor related to other types of configured measurements,
    wherein N represents a scaling factor for receive (RX) beam refinement,
    wherein $P_{CBD}$ represents a sharing factor for related to secondary cell (SCell) CBD,
    wherein $P_{TRP}$ represents a CBD TRP sharing factor, and
    wherein $T_{CBD-RS}$ represents a periodicity of a measurement resource; and
    transmitting a beam failure recovery (BFR) request to the base station.

2. The processor of claim 1, wherein the BFD evaluation period comprises a first portion during which the UE evaluates the first TRP for BFD and a second portion during which the UE evaluates the second TRP for BFD.

3. The processor of claim 2, wherein the first portion and the second portion are equal.

4. The processor of claim 2, wherein BFD evaluation period is based on a sharing factor indicating a percentage of the BFD evaluation period to be used for the first TRP and a percentage of the BFD evaluation period to be used for the second different TRP.

5. The processor of claim 1, wherein the BFD evaluation period is based on Max(50,$[M_{BFD} \times P \times N \times P_{BFD} \times P_{TRP}] \times T_{BFD-RS}$),
    wherein $M_{BFD}$ represents a number of samples,
    wherein P represents a sharing factor related to other types of configured measurements,
    wherein N represents a scaling factor for receive (RX) beam refinement,
    wherein $P_{BFD}$ represents a sharing factor related to secondary cell (SCell) BFD,
    wherein $P_{TRP}$ represents a BFD TRP sharing factor, and
    wherein $T_{BFD-RS}$ represents a periodicity of a measurement resource.

6. The processor of claim 1, wherein the BFD evaluation period is based on Max(50,$[1.5 \times M_{BFD} \times P \times N \times P_{BFD} \times P_{TRP}] \times$ Max($T_{DRX}, T_{BFD-RS}$)),
    wherein $M_{BFD}$ represents a number of samples,
    wherein P represents a sharing factor related to other types of configured measurements,
    wherein N represents a scaling factor for receive (RX) beam refinement,
    wherein $P_{BFD}$ represents a sharing factor related to secondary cell (SCell) BFD,
    wherein $P_{TRP}$ represents a BFD TRP sharing factor, and
    wherein $T_{BFD-RS}$ represents a periodicity of the measurement resource.

7. The processor of claim 1, wherein the BFD evaluation period is based on $[M_{BFD} \times P \times N \times P_{BFD} \times P_{TRP}] \times T_{DRX}$,
    wherein $M_{BFD}$ represents a number of samples,
    wherein P represents a sharing factor related to other types of configured measurements,
    wherein N represents a scaling factor for receive (RX) beam refinement,
    wherein $P_{BFD}$ represents a sharing factor related to secondary cell (SCell) BFD,
    wherein $P_{TRP}$ represents a BFD TRP sharing factor, and
    wherein $T_{DRX}$ represents a discontinuous reception (DRX) cycle length.

8. The processor of claim 1, wherein a BFD evaluation period comprises a first portion during which the UE evaluates the first TRP for CBD and a second portion during which the UE evaluates the second TRP for CBD.

9. The processor of claim 8, wherein the first portion and the second portion are equal.

10. The processor of claim 8, wherein the CBD TRP sharing factor indicates a percentage of the CBD evaluation period to be used for the first TRP and a percentage of the CBD evaluation period to be used for the second TRP.

11. The processor of claim 1, wherein the beam failure is detected on the first beam and wherein the BFR request is transmitted on the second beam.

12. The processor of claim 1, wherein the UE is configured with a first component carrier (CC) corresponding to both the first TRP and the second TRP and a second CC corresponding to a third TRP.

13. The processor of claim 12, wherein the beam failure is detected on the first beam and the second beam and wherein the BFR request is transmitted on the second CC.

14. A user equipment (UE), comprising:
    a transceiver configured to communicate with a base station; and
    a processor communicatively coupled to the transceiver and configured to perform operations comprising:
        establishing a connection to the base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2;
        detecting a beam failure during a beam failure detection (BFD) evaluation period;
        identifying one or more candidate beams during a candidate beam detection (CBD) evaluation period, wherein the CBD evaluation period is based on Max(25,Ceil($M_{CBD} \times P \times N \times P_{CBD} \times P_{TRP}$)$\times T_{CBD-RS}$), wherein $M_{CBD}$ represents a number of samples, wherein P represents a sharing factor related to other types of configured measurements, wherein N represents a scaling factor for receive (RX) beam refinement, wherein $P_{CBD}$ represents a sharing factor for related to secondary cell (SCell) CBD, wherein $P_{TRP}$ represents a CBD TRP sharing factor, and wherein $T_{CBD-RS}$ represents a periodicity of a measurement resource; and transmitting a beam failure recovery (BFR) request to the base station.

15. A processor of a user equipment (UE) configured to perform operations comprising:

establishing a connection to a base station, wherein the base station configures the UE with a first beam corresponding to a first transmission reception point (TRP) and a second beam corresponding to a second TRP, wherein the first and second beam are in frequency range 2 (FR2) and wherein the UE does not support simultaneous reception of multiple beams in FR2;

detecting a beam failure during a beam failure detection (BFD) evaluation period;

identifying one or more candidate beams during a candidate beam detection (CBD) evaluation period, wherein the CBD evaluation period is based on Ceil($M_{CBD} \times P \times N \times P_{CBD} \times P_{TRP}$)$\times T_{DRX}$, wherein $M_{CBD}$ represents a number of samples, wherein P represents a sharing factor related to other types of configured measurements, wherein N represents a scaling factor for receive (RX) beam refinement, wherein $P_{CBD}$ represents a sharing factor related to secondary cell (SCell) CBD, wherein $P_{TRP}$ represents a CBD TRP sharing factor, and wherein $T_{DRX}$ represents a discontinuous reception (DRX) cycle length; and transmitting a beam failure recovery (BFR) request to the base station.

16. The processor of claim 15, wherein the BFD evaluation period comprises a first portion during which the UE evaluates the first TRP for BFD and a second portion during which the UE evaluates the second TRP for BFD.

17. The processor of claim 16, wherein the first portion and the second portion are equal.

18. The processor of claim 16, wherein a BFD TRP sharing factor indicates a percentage of the BFD evaluation period to be used for the first TRP and a percentage of the BFD evaluation period to be used for the second different TRP.

* * * * *